Patented Feb. 23, 1954

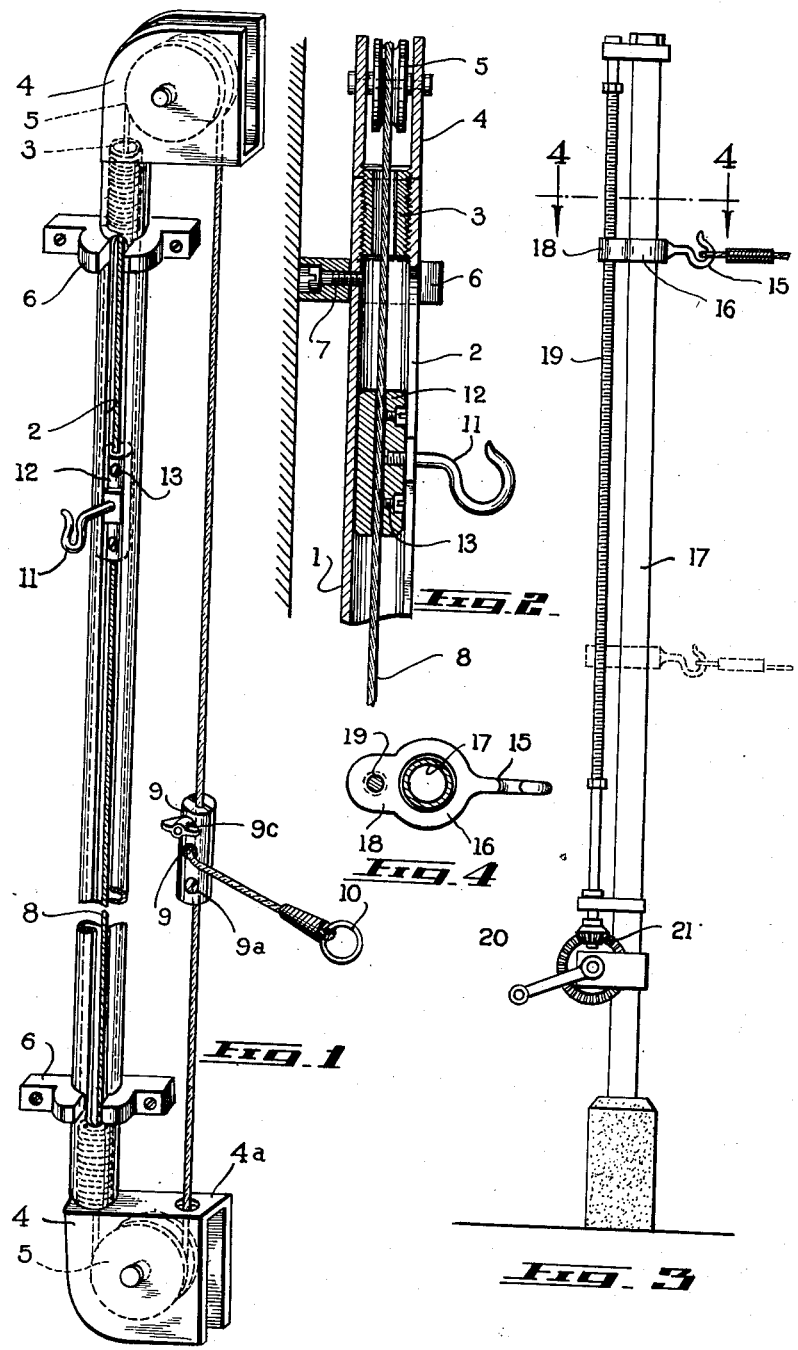

2,670,168

UNITED STATES PATENT OFFICE 2,670,168

SLIDING HOOK

Lucien Magnan and Harry Switzman, Montreal, Quebec, Canada

Application September 19, 1949, Serial No. 116,424

2 Claims. (Cl. 248—295)

Our present invention relates to improvements in a sliding hook and appertains particularly to one suitable for use with a clothes drier or the like or any comparable device where it is desired to raise and lower a suspending hook-like member to different elevations.

An object of the invention is to provide a cord or cable-carried hook, slidable in or on a supporting rod, having means for positively raising and lowering the hook and for resisting accidental or unwanted descent thereof.

A further object of the invention is the provision of a sliding hook for use in supporting diverse items, such as a clothes line, at various selected levels having a frame like structure adaptable for mounting on a wall or other vertical surface.

A still further object of the invention is to provide a sliding hook of the nature and for the purposes described that is characterized by structural simplicity, durability and efficiency, ease of operation and low cost of production and installation whereby the same is rendered commercially desirable.

To the accomplishment of these and related objects as shall become apparent as the description proceeds, the invention resides in the construction, combination and arrangement of parts as shall be hereinafter more fully described, illustrated in the accompanying drawings, and pointed out in the claims hereunto appended.

The invention will be best understood and can be more clearly described when reference is had to the drawings forming a part of this disclosure wherein like characters indicate like parts throughout the several views.

In the drawings:

Figure 1 is a perspective elevation of a preferred form of my sliding hook;

Figure 2 is an enlarged vertical section through the upper portion thereof;

Figure 3 is an elevation of a modified form of the invention adapted for outside use; and Figure 4 is an enlarged transverse, horizontal section therethrough as taken on the line 4—4 looking in the direction indicated by the arrows.

The principal features of the invention will be seen to reside in the form and manner of mounting the hook with relation to the elongated rod or carrying member, of raising, lowering and anchoring the hook and of constructing and attaching the frame-like structure.

In our invention we prefer to use a hollow tube I of any desired length with a narrow slot 2 therein running almost from end to end. By means of a threaded nipple 3, a U-shaped pulley block 4 is secured to each end, offsetting laterally therefrom, and each having a pulley 5 rotatable therein.

Tube-embracing brackets 6, attached thereto by recessed studs 7 concealed in the rear face, serve to mount the tube and its appurtenances, as for instance on an apartment room wall. Running through the tube I and over the spaced pulleys 5 is a cable 8 whose opposite and exposed ends are united in a two-part clamping coupling 9. One end, preferably the lower, is anchored therein as by the screw fastener 9a while the other end, entering the coupling axially, emerges laterally through a radial bore 9b, being adjustably drawable through the coupling and selectably clamped therein by a wing nut and bolt 9c that draws the parts of the split coupling lightly together in cable gripping relation. The second or adjustably clamped end of the cable 8 is terminally provided with a handy pull ring 10.

In the embodiment of the invention shown in Figures 1 and 2, the U-shaped pulley blocks are seen to extend sideways from the tube I and thus lie closely against the wall of the room. They are wider than necessary to carry the sheaves or pulleys and are each provided with a cable-passing perforation 4a in the base of the U and in line with the pulley's circumference. If this sheave block were narrower the bore could be eliminated as the cable could pass clear of the base of the block but it will be found useful, as when the cable 8 is run around the pulleys 5 until the coupling 9 engages the base of the U-shaped block and is stopped thereby, for facilitating the operation of the wing nut 9c and the tightening or loosening of the cable in the clamping coupling.

The hook II is threaded in a cylindrical block 12 centrally bored for the accommodation of the cable 8 and firmly secured thereto by a pair of recessed, radially disposed, cable-engaging set screws 13. The block has a close sliding fit in the tube I and the laterally projecting hook II extends outwards through the slot 2 in the front of the tube, thus lying at right angles to the plane of its carrying cable.

A modified form of hook and supporting column is seen in Figures 3 and 4. Here the hook 15 is mounted on a ring or annulus 16 that surrounds the post or pipe 17 instead of travelling in it, as in the former case. Obviously this hook and column could be mounted and cable operated as in the previously described form. However, we have shown the hook's ring 16 as provided with an extending lug 18, vertically bored and threaded and travelling on a jack screw 19 paralleling the post 17 and rotatable by a hand crank 20 through the medium of a pair of engaged miter gears 21.

In use this sliding hook will be seen to have many uses, not the least being for carrying opposite ends of the clothes line, either indoors or out and in other domestic and industrial installations to which it is readily adaptable, and to which it is commended in part at least by the ease with which the hook can be secured at the desired level by simply tightening the cable end that is slidably in the coupling.

From the foregoing description taken in connection with the accompanying drawings, it will be manifest that a sliding hook is provided that will fulfill all the necessary requirements of such a device, but as many changes could be made in the above description and many apparently widely different embodiments of the invention may be constructed within the scope of the appended claims, without departing from the spirit or scope thereof, it is intended that all matters contained in the said accompanying specification and drawings shall be interpreted as illustrative and not in a limitative or restrictive sense.

We claim:

1. A sliding hook structure comprising a hollow pipe having an elongated slot therein; a hollow, exteriorly threaded nipple projecting from each end of said pipe; an offsetting U-shaped pulley block on each end of said pipe secured thereto by said respective nipples, said U-shaped blocks each having a perforation in the base thereof spaced from said nipple; a pulley in each block and of a diameter substantially corresponding to the spacing of said nipple and the perforation in said block so that the axis of the nipple and perforation are tangential to the pulley; a cable having its ends connected and encircling said pulleys, one length of said cable passing through said hollow pipe and nipples and the other and parallel length passing through the block perforations and extending exteriorly of said pipe, with the connected ends of said cable occurring in the external reach; a cylindrical carrier slidable in said pipe and secured in longitudinally adjustable relation to said cable intermediate the connected ends thereof; and a hook-like member projecting from said carrier through the slot in said pipe.

2. An article of manufacture for use in an apartment clothes drier or the like, comprising a length of hollow pipe having an elongated slot; wall mounting brackets partially embracing said pipe; a hollow, exteriorly threaded nipple in each end of said pipe; a U-shaped pulley block secured by said respective nipples in laterally offset relation to opposite ends of said pipe, each U-shaped block having a perforation in the base of the U spaced from said nipple; a pulley in each of said blocks; a cable passing through said pipe and nipples and over said pulleys thence through the perforations in the base of said U-shaped pulley blocks; a coupling member adjustably joining the free ends of said cable exteriorly of said pipe and engageable with either of said U-shaped pulley blocks as a stop; a cylindrical carrier adjustably secured on said cable and slidable longitudinally within said pipe and a hook secured in said carrier and projecting through the slot in said pipe; whereby the hook carrier may be so positioned along the interior reach of said cable that the end coupling member on the external reach of said cable may act as a stop on engaging either perforated U-shaped pulley block to limit movement of said hook in said pipe slot.

LUCIEN MAGNAN.
HARRY SWITZMAN.

References Cited in the file of this patent

UNITED STATES PATENTS

| Number | Name | Date |
|---|---|---|
| 596,904 | McLellan | Jan. 4, 1898 |
| 1,207,401 | Heller | Dec. 5, 1916 |
| 1,333,326 | McLean | Mar. 9, 1920 |
| 1,613,477 | Olson | Jan. 4, 1927 |
| 1,749,181 | Ehret | Mar. 4, 1930 |
| 1,810,868 | Zury | June 16, 1931 |
| 1,937,571 | Hueneburg | Dec. 5, 1933 |
| 2,131,416 | Zetts | Sept. 27, 1938 |
| 2,229,898 | Pastva | Jan. 28, 1941 |
| 2,495,804 | Berchtold | Jan. 31, 1950 |